(12) United States Patent
Smerczek (10) Patent No.: US 12,508,839 B2
(45) Date of Patent: Dec. 30, 2025

(54) DRIVE MODULE FOR A MOTOR VEHICLE

(71) Applicant: ZF Friedrichshafen AG, Friedrichshafen (DE)

(72) Inventor: Simon Smerczek, Fürstenstein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 30 days.

(21) Appl. No.: 18/520,907

(22) Filed: Nov. 28, 2023

(65) Prior Publication Data

US 2024/0190175 A1 Jun. 13, 2024

(30) Foreign Application Priority Data

Dec. 13, 2022 (DE) ...................... 10 2022 213 497.4

(51) Int. Cl.
*B60B 35/16* (2006.01)
*B60B 35/12* (2006.01)
(Continued)

(52) U.S. Cl.
CPC ............ *B60B 35/16* (2013.01); *B60B 35/121* (2013.01); *F16C 19/383* (2013.01);
(Continued)

(58) Field of Classification Search
CPC ............................ F16C 33/6659; F16C 33/664
See application file for complete search history.

(56) References Cited

U.S. PATENT DOCUMENTS 2,037,173 A * 4/1936 Matthews ............ F16H 57/0483
475/160
2,840,186 A * 6/1958 Nyland ............... F16H 57/0483
184/6.12
(Continued)

FOREIGN PATENT DOCUMENTS

DE 2150676 C3 4/1973
DE 102012213962 A1 5/2014
(Continued)

OTHER PUBLICATIONS

German Search Report DE 10 2022 213 497.4, dated Jul. 20, 2023. (12 pages).

*Primary Examiner* — Michael A Riegelman
(74) *Attorney, Agent, or Firm* — Dority & Manning, P.A.

(57) ABSTRACT

A drive module (1, 1*a*) includes an axle casing (2) and a shaft (3) rotatably mounted in an interior space (11) of the axle casing (2). Two bearing units (6, 6*a*) lie opposite each other and are secured in the axle casing (2) in an axial direction. Each bearing unit (6, 6*a*) includes an inner bearing ring (7, 7*a*) fixedly connected to the shaft (3), an outer bearing ring (8, 8*a*) fixedly connected to the axle casing (2), and rolling elements (9, 9*a*) arranged between the inner bearing ring (7, 7*a*) and the outer bearing ring (8, 8*a*). A lubricating fluid is present at least in the interior space (11). The lubricating fluid forming a fluid reservoir at a bottom of the interior space (11). The axle casing (2) includes a fluid opening extending, in each case, from the interior space (11) to a respective bearing unit (6, 6*a*) for conducting the lubricating fluid to the rolling elements (9, 9*a*). At least one conduction device is fluidically connected to the fluid reservoir and is configured for conducting the lubricating fluid the interior space (11) to the respective fluid opening.

12 Claims, 4 Drawing Sheets

(51) Int. Cl.
*F16C 19/38* (2006.01)
*F16C 33/66* (2006.01)

(52) U.S. Cl.
CPC ...... *F16C 33/6644* (2013.01); *F16C 33/6681* (2013.01); *F16C 33/6685* (2013.01); *F16C 2326/01* (2013.01)

(56) References Cited

U.S. PATENT DOCUMENTS

| | | | | |
|---|---|---|---|---|
| 3,825,099 | A * | 7/1974 | Hopf | F16H 57/0421 184/6.12 |
| 5,328,275 | A * | 7/1994 | Winn | F16C 35/077 384/589 |
| 5,340,273 | A * | 8/1994 | Rockwood | F16C 33/6659 415/173.5 |
| 5,499,902 | A * | 3/1996 | Rockwood | H02K 49/106 417/423.12 |
| 5,591,020 | A * | 1/1997 | Rockwood | B05D 7/00 417/423.12 |
| 5,904,427 | A * | 5/1999 | Braun | F16N 7/18 384/473 |
| 6,200,037 | B1 * | 3/2001 | Braun | F16C 33/6659 384/466 |
| 6,454,051 | B1 * | 9/2002 | Okayasu | F16N 7/36 184/13.1 |
| 6,460,656 | B1 * | 10/2002 | Jones, Jr. | F16C 33/664 184/13.1 |
| 6,776,261 | B2 * | 8/2004 | Eriksen | F16C 41/008 324/636 |
| RE39,217 | E * | 8/2006 | Rockwood | F16C 33/6659 184/11.2 |
| 8,636,113 | B2 * | 1/2014 | Knoblauch | F16H 57/0427 384/473 |
| 8,960,362 | B2 * | 2/2015 | Barbir | F16H 57/0483 184/6.12 |
| 10,288,081 | B1 * | 5/2019 | Maxwell, III | F04D 13/021 |
| 10,828,934 | B2 * | 11/2020 | Jimenez | F16C 19/548 |
| 2003/0183455 | A1 * | 10/2003 | Schneider | F16N 7/26 184/11.1 |
| 2010/0304914 | A1 * | 12/2010 | Barrett | F16H 48/08 475/160 |
| 2013/0001018 | A1 * | 1/2013 | Masuda | F16H 57/0483 184/6.12 |
| 2024/0190175 | A1 * | 6/2024 | Smerczek | F16C 19/383 |

FOREIGN PATENT DOCUMENTS

| | | |
|---|---|---|
| DE | 102010052310 B4 | 8/2014 |
| DE | 102014009461 A1 | 12/2014 |
| JP | H08-254259 A | 10/1996 |
| JP | 2012-202532 A | 10/2012 |

\* cited by examiner

DRIVE MODULE FOR A MOTOR VEHICLE

CROSS-REFERENCE TO RELATED APPLICATION

The present application is related and has right of priority to German Patent Application No. DE102022213497.4 filed on Dec. 13, 2022, which is incorporated by reference in its entirety for all purposes.

TECHNICAL FIELD

The invention relates generally to a drive module including an axle casing and a shaft, which is rotatably mounted in an interior space of the axle casing, and two bearing units which lie opposite each other and are secured in the axle casing in an axial direction, wherein each of the bearing units has an inner bearing ring, which is fixedly connected to the shaft, and an outer bearing ring, which is fixedly connected to the axle casing, and rolling elements which are arranged between the inner bearing ring and the outer bearing ring, and wherein a lubricating fluid is present at least in the interior space, the lubricating fluid forming a fluid reservoir at the bottom of the interior space.

BACKGROUND

Drive modules having an axle casing and a shaft must generally perform the important function of guiding the rotational motion and supporting the weight of the motor vehicle, which function is conventionally performed by bearing units having rolling elements and oblique contacts, in particular tapered roller bearings.

Furthermore, such bearing units must effectuate the transmission of the drive torque via a shaft which is connected to a hub, in order to set the hub into rotation.

The bearing units arranged on the axle casing require a lubricant in order to increase the service life of the bearing units and to improve functional capability. The bearing units must be relubricated, however, since one filling of lubricant does not suffice for an entire service life of the vehicle.

Efforts are underway to lubricate the bearing units with circulating oil.

DE 102012213962 A1 discloses a bearing assembly having an end shield for supporting a shaft in a housing, wherein the end shield is made of metal sheet, the contour of which is shaped in the area of the bearing points such that a lubricant chamber is provided.

DE 102010052310 B4 discloses a shaft arrangement, in particular for transmissions of motor vehicles, including a shaft and multiple components arranged thereon, the components being arranged axially next to one another and which are to be lubricated and/or cooled in succession by a fluid, wherein a fluid supply device is designed to supply the fluid to the shaft arrangement from radially outside, wherein an idler gear is mounted next to a component in an axial direction, the idler gear being rotatably mounted on the shaft by an idler gear bearing and having an axial recess into which a fluid-conducting section protrudes, wherein the idler gear has at least one fluid-conducting groove in the region of the axial recess, the fluid-conducting groove being shaped and aligned such that it conducts fluid out of the axial recess radially inward during rotation of the idler gear, such that fluid conducted by the fluid-conducting groove is supplied to the idler gear bearing.

DE102014009461 A1 discloses a drive axle assembly which includes the following: a housing; an input shaft which extends into the housing and is arranged around a rotation axis; a first spur gear which is arranged around the input shaft and the rotation axis, wherein the first spur gear is configured to deliver power to a differential of a first wheel, wherein the differential of the first wheel has a crown gear; a second spur gear which is arranged around a pinion shaft, wherein the pinion shaft is configured to deliver power to the differential of the first wheel via a pinion, wherein the second spur gear is drivingly coupled to the first spur gear; a front bearing which is arranged ahead of and adjacent to the first spur gear, wherein the bearing is arranged around the input shaft and rotatably supports the input shaft within the housing; and a rear bearing which is arranged behind and adjacent to the first spur gear, wherein the bearing is arranged around the input shaft and rotatably supports the input shaft within the housing, wherein the first and the second spur gears pump a lubricant from the housing to a lubricant passage and deliver the lubricant to a radial end face of at least one of the front and rear bearings.

BRIEF SUMMARY

Example aspects of the invention provide an improved drive module.

Example aspects of the invention provide a drive module including an axle casing and a shaft, which is rotatably mounted in an interior space of the axle casing, and two bearing units, which lie opposite each other and are secured in an axial direction in the axle casing, wherein each of the bearing units has an inner bearing ring, which is fixedly connected to the shaft, and an outer bearing ring, which is fixedly connected to the axle casing, and rolling elements which are arranged between the inner bearing ring and the outer bearing ring, and wherein a lubricating fluid is present at least in the interior space, the lubricating fluid forming a fluid reservoir at the bottom of the interior space, and wherein the axle casing has a fluid opening which extends in each case from the interior space to the particular bearing unit for conducting the lubricating fluid to the rolling elements, and wherein at least one conduction device is provided, which is fluidically connected to the fluid reservoir and is designed to conduct the lubricating fluid present in the interior space to the particular fluid opening.

The fluid is, in particular, a lubricant, for example, oil, which is necessary for smoothly operating the vehicle. An insufficient amount of fluid negatively affects the service life of the components to be lubricated in and on the axle casing.

The drive module can be, for example, an axle in an agricultural vehicle.

Furthermore, a drive shaft can be provided.

An axial direction extends parallel to the rotation axis of the shaft.

In particular, the bearing units are tapered roller bearings.

The bottom faces the roadway, i.e., the bottom is arranged underneath in the direction of gravity.

Due to such a conduction device, the oil which is already present, for example, the oil sump, can be used in the axle casing to simultaneously oil/lubricate the surrounding components and the bearing units.

Separately refilling lubricant at the bearing units can be dispensed with.

Due to the drive module according to example aspects of the invention, sufficient lubrication of the bearing units over the entire service life is ensured.

In one further example embodiment, a drive shaft is provided, which is arranged in the axle casing underneath the shaft in the direction of gravity and transversely to the shaft, wherein the drive shaft is arranged between the two bearing units in the interior space of the axle casing, and wherein the conduction device is formed as at least one mechanical turbulizer which is co-rotationally mounted on the drive shaft and is designed to at least partially plunge into the fluid reservoir during rotation of the drive shaft. As a result, the rotation creates turbulence in the fluid.

The term "transversely" means substantially orthogonal with respect to the shaft.

This means, the drive shaft, which is arranged, in particular, centrally between the bearing units, is arranged above the fluid reservoir, and this fluid, which is oil in this case, is sprayed onto the sides of the interior space and onto the shaft due to the turbulence.

Due to the turbulizer, the lubricating fluid, which is the oil in this case, is swirled during rotation such that the oil sprays upward onto the shaft and the surrounding portions of the interior space. From the shaft, the oil can then run through the fluid opening to the rolling elements and thus supply the bearing units with lube oil. Some of the upwardly spraying oil can also flow directly through the fluid openings.

Due to such a turbulizer, which can churn in the oil sump or in the fluid reservoir, the distance to the static oil level, which is formed by the oil at the bottom of the interior space, can be overcome.

In one further example embodiment, the at least one mechanical turbulizer is fastened on the drive shaft by a clamping connection or by a bolt connection. The mechanical turbulizer can be, for example, a spinner having a protruding churning element, for example, a protruding prong, which can be fixed on the drive shaft via a spring force by clamping. Furthermore, a bolt connection can also be provided. Such a spinner can be, for example, cast.

Such a spinner can be arranged on the drive shaft, for example, centrally between the two bearing units in order to achieve sufficient turbulence of the oil for both bearing units.

In one further example embodiment, the at least one mechanical turbulizer is integrally arranged on the drive shaft. The turbulizer can be easily welded on. As a result, simple and cost-effective manufacturing is possible.

In one further example embodiment, multiple mechanical turbulizers can be provided, wherein the mechanical turbulizers are differently designed and/or are distributed over the circumference. As a result, for example, uniform turbulence and a turbulence close to the bearing units can be achieved.

In one further example embodiment, multiple fluid openings, which are present in the axle casing, are arranged facing from one of the bearing units in each case toward the interior space in order to establish a fluidic connection between the bearing units and the fluid reservoir.

In particular, the multiple fluid openings in the axle casing underneath the shaft in the direction of gravity are arranged facing the interior space in order to form the fluidic connection between a bearing unit and the interior space in each case.

The multiple fluid openings can be formed as bores in the axle casing. As a result, simple manufacturing is possible.

Furthermore, at least some of the multiple fluid openings can be introduced in the axle casing so as to be aligned with the rolling elements in order to directly conduct the lubricating fluid to the rolling elements.

A larger bore or multiple smaller bores can be present, the bores extending practically from the rolling elements to the interior space. The bores can also taper, for example, toward the rolling elements, such that the upwardly spraying oil can be better collected from the interior space and transported to the rolling elements.

Due to these fluid openings, which are formed as bores, and the turbulizer, simple and cost-effective permanent lubrication of the rolling elements and of the bearing units is effectuated.

In one further example embodiment, the shaft has fluid-conducting channels which extend in an axial direction to the fluid openings. An axial direction is substantially parallel to the rotation axis.

The fluid-conducting channels can be introduced into the shaft as grooves. Grooves or other elements which are suitable for conducting oil can also be used, however. This ensures that the upwardly spraying oil does not immediately drip off the shaft in the direction of gravity, but rather is conducted to the fluid openings due to the rotation.

The fluid-conducting channels can be introduced over the circumference of the shaft. Due to such targeted conduction, simple and sufficient lubrication of the bearing units can be ensured.

Alternatively or optionally in addition, a lubricating fluid pump, in this case an oil pump, is provided, wherein the fluid openings are formed by fluid channels, at least some of which are introduced in the axle casing, and external lines, for conducting the lubricating fluid via the lubricating fluid pump from the fluid reservoir to the bearing units.

The can be an externally arranged oil pump. The externally arranged oil pump can be connected to the oil sump via first bores in the axle casing. The oil can be conducted above the bearing units through the external lines counter to the direction of gravity. There, the oil can be distributed onto the two bearing units through second bores in the axle casing. The second bores can be introduced above the respective bearing units in order to supply the oil to the rolling elements. As a result, an adjustable amount of oil can be supplied to the bearing units as lubricant.

In one further example embodiment, the bearing units each have at least one bypass channel which forms a fluidic connection from the respective bearing units to the interior space. The bypass channel is arranged, in particular, at the bottom of the particular bearing unit. As a result, excess lubricating fluid, in particular oil, can be discharged from the bearing units, such that, for example, overheating in the bearing unit or possibly even churning can be prevented. The bypass channel can be formed, for example, as a simple bore.

In one further example embodiment, the bypass channel is arranged in each case opposite the respective fluid openings in an axial direction. This means, the lubricating fluid, in particular the oil, passes through the rolling elements in an axial direction and only then can flow back into the oil sump.

BRIEF DESCRIPTION OF THE DRAWINGS

Further example properties and advantages of the present invention are obvious from the following description with reference to the attached figures, wherein schematically.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
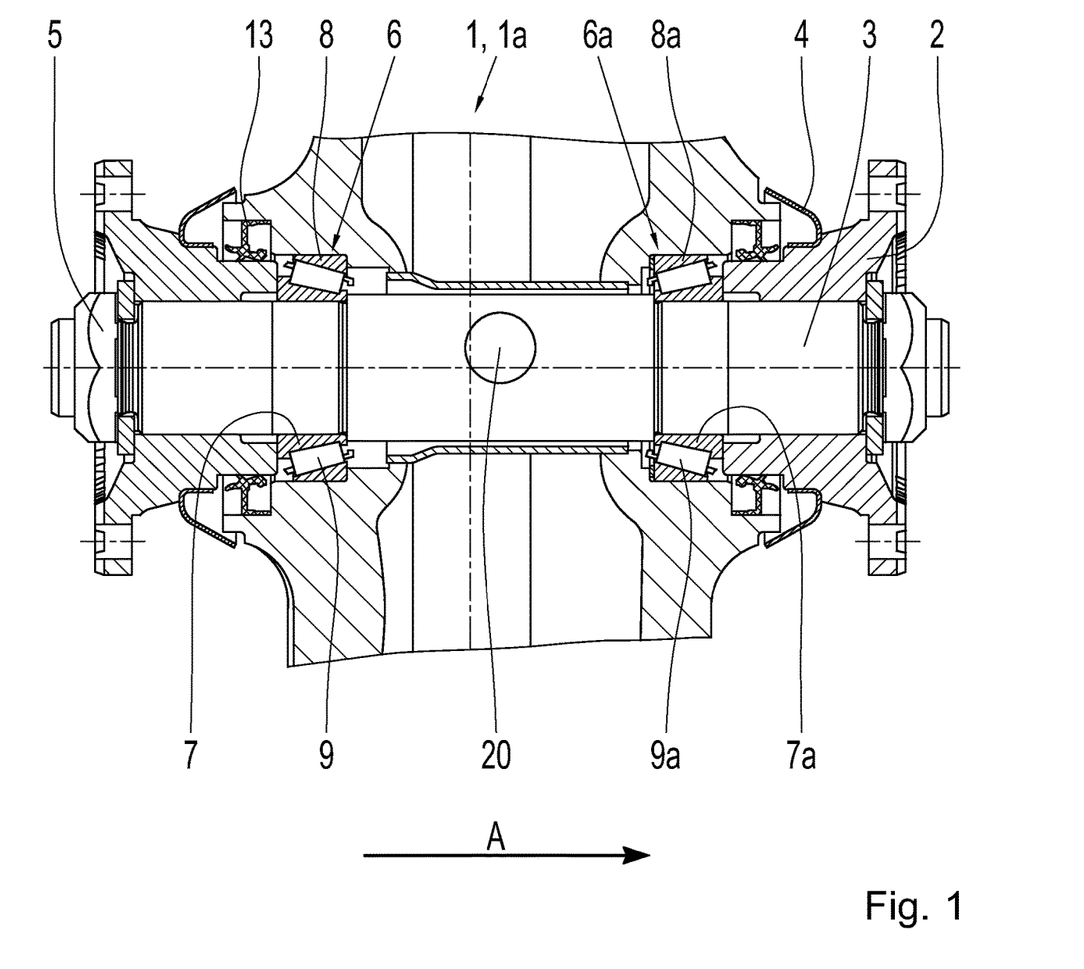
FIG. 1: shows a drive module for a vehicle.

FIG. 1 schematically shows a sectioning of a drive module 1, 1a along an axial axis A. The drive module 1, 1a has an axle casing 2 in which a shaft 3 is rotatably mounted, the shaft 3 having a flange 5 at the end. A cooling and lubricating fluid circulates in the axle casing 2 and, at the bottom, which faces the roadway, forms an oil sump 12 (FIG. 2), which has an oil level 21.

Furthermore, a shield plate 4 is provided, as well as sealing lips 13 for sealing.

A bearing unit 6, 6a is also provided. The bearing unit 6, 6a includes an inner bearing ring 7, 7a, which is connected to the shaft 3, and an outer bearing ring 8, 8a which is fixed to the axle casing 2. Rolling elements 9, 9a are arranged between the inner bearing ring 7, 7a and the outer bearing ring 8, 8a. In particular, the bearing units 6, 6a are tapered roller bearings.

The bearing units 6, 6a are used essentially to guide the rotational motion and to support the weight of the motor vehicle.

Furthermore, such bearing units 6, 6a must effectuate the transmission of the drive torque via the shaft 3 which is connected to a hub, in order to set the hub into rotation.

In particular, the bearing units 6, 6a can be braced in the axle casing 2.

Furthermore, the drive module 1 includes a drive shaft 20, which is arranged in an interior space 11 in the axle casing 2 underneath in the direction of gravity and transversely to the shaft 3.

Figure 2:
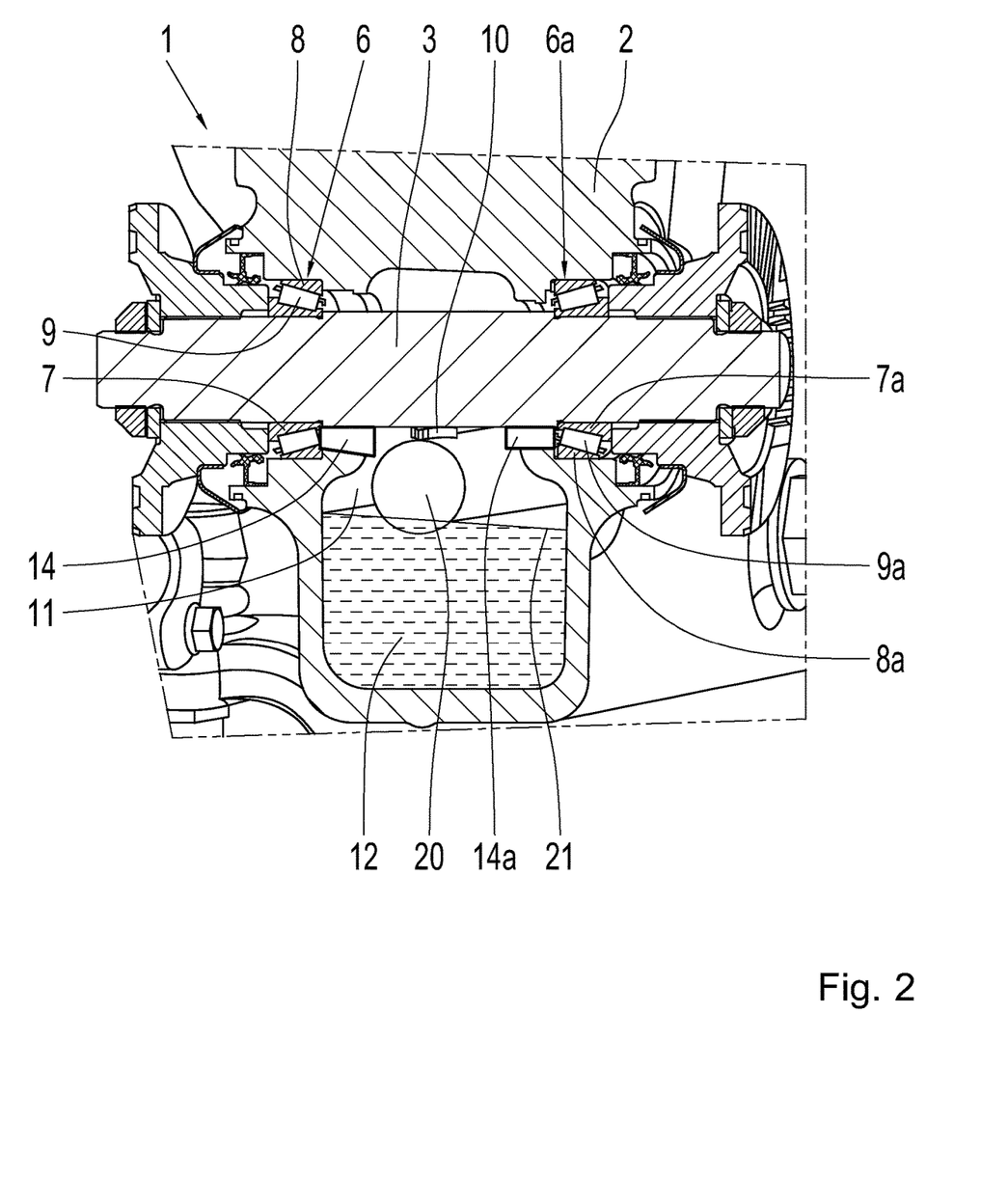
FIG. 2: shows a drive module according to a first example embodiment.

FIG. 2 shows the drive module 1 in a first example embodiment.

The drive module 1 includes the bearing units 6, 6a having the inner bearing ring 7, 7a and an outer bearing ring 8, 8a and the rolling elements 9, 9a.

Furthermore, the axle casing 2 has the interior space 11 which is partially filled with oil for lubricating the surrounding components. The oil has an oil level 21 and thus forms an oil sump 12.

Furthermore, the drive module 1 includes a drive shaft 20 which is arranged in the interior space 11 in the axle casing 2 underneath in the direction of gravity and transversely to the shaft 3. The drive shaft 20 is arranged between the two bearing units 6, 6a such that the drive shaft 20 plunges above or at least only partially in the oil sump 12.

Furthermore, the drive module 1 has a turbulizer 10. The turbulizer 10 is arranged on the drive shaft 20 such that the turbulizer 10 churns in the oil during rotation. As a result, the oil is swirled and sprays onto the shaft 3 and onto the side walls of the interior space 11.

Furthermore, fluid bores 14, 14a are provided as fluid openings which form a connection from the interior space 11 to the bearing units 6, 6a. In particular, the fluid bores 14, 14a are fluidically connected to the rolling elements 9, 9a; for example, this can be effectuated via a corresponding opening in the respective bearing units 6a, 6, for example, directly ahead of or at the rolling elements 9, 9a.

The fluid bore 14a can, for example, also taper, such that the fluid bore 14a has a large opening to the interior space 11, in order to practically collect upwardly spraying oil. Due to the rotation, the oil is subsequently transported to the rolling elements 9a and lubricates these. As a result, continuous lubrication of the bearing unit 6a is effectuated.

Furthermore, the upwardly spraying oil can also run along the shaft 3 and flow into the fluid bore 14 in order to lubricate the rolling elements 9. The shaft 3 can include fluid-conducting channels (not shown), for example, in an axial direction A. Grooves or other elements which are suitable for conducting oil can also be used, however. This ensures that the upwardly spraying oil does not immediately drip off the shaft 3 in the direction of gravity, but rather is conducted to the fluid bore 14 by the fluid-conducting channels due to the rotation.

The fluid-conducting channels (not shown) can be introduced over the circumference of the shaft 3.

Furthermore, a combination of a tapering fluid bore 14a and the fluid-conducting channels formed as grooves can also be present in order to effectuate a lubrication of the bearing units 6, 6a.

Due to such a mechanical turbulizer 10 and the fluid-conducting channels, simple lubrication of the bearing units 6, 6a can be effectuated.

The turbulizer 10 can be formed as a simple welded-on protrusion.

Figure 3:
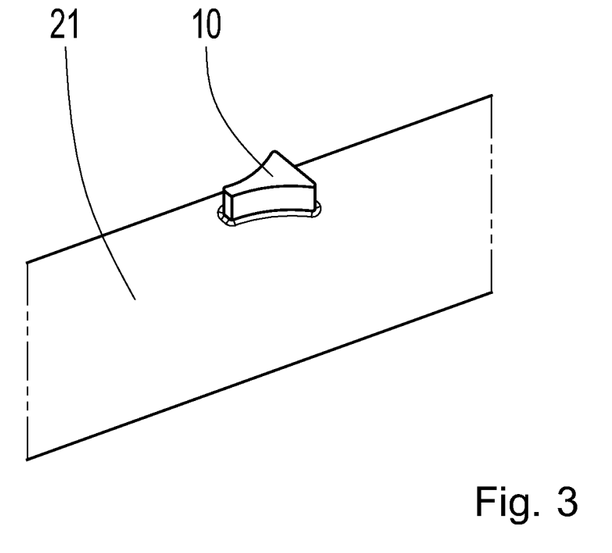
FIG. 3: shows a turbulizer.

FIG. 3 shows such a mechanical turbulizer 10 in detail, the mechanical turbulizer 10 being formed as a protrusion and being welded on the drive shaft 20.

Figure 4:
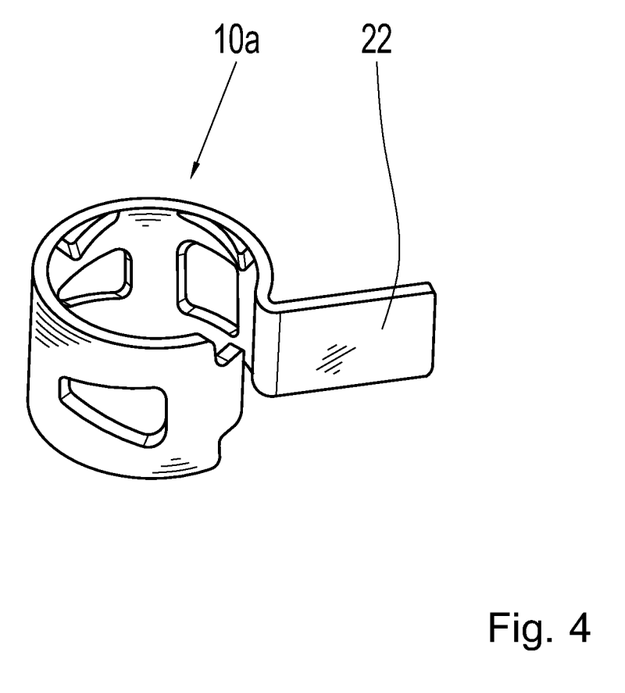
FIG. 4: shows one further example embodiment of a turbulizer.

FIG. 4 shows one further example embodiment of a turbulizer 10a.

The turbulizer 10a is designed as a rotating spinner having one prong 22 as a churning element. The spinner can be fastened on the drive shaft 20 via a spring force due to a clamping effect.

The spinner or the protrusion can also be fastened on the drive shaft 20 by a bolt connection.

The spinner or the protrusion can be, for example, cast.

Furthermore, multiple turbulizers 10, 10a can be arranged on the drive shaft 20 or variously designed turbulizers 10, 10a can be present, which effectuate a uniform turbulence and/or increased turbulence also at the sides of the interior space 11.

Figure 5:
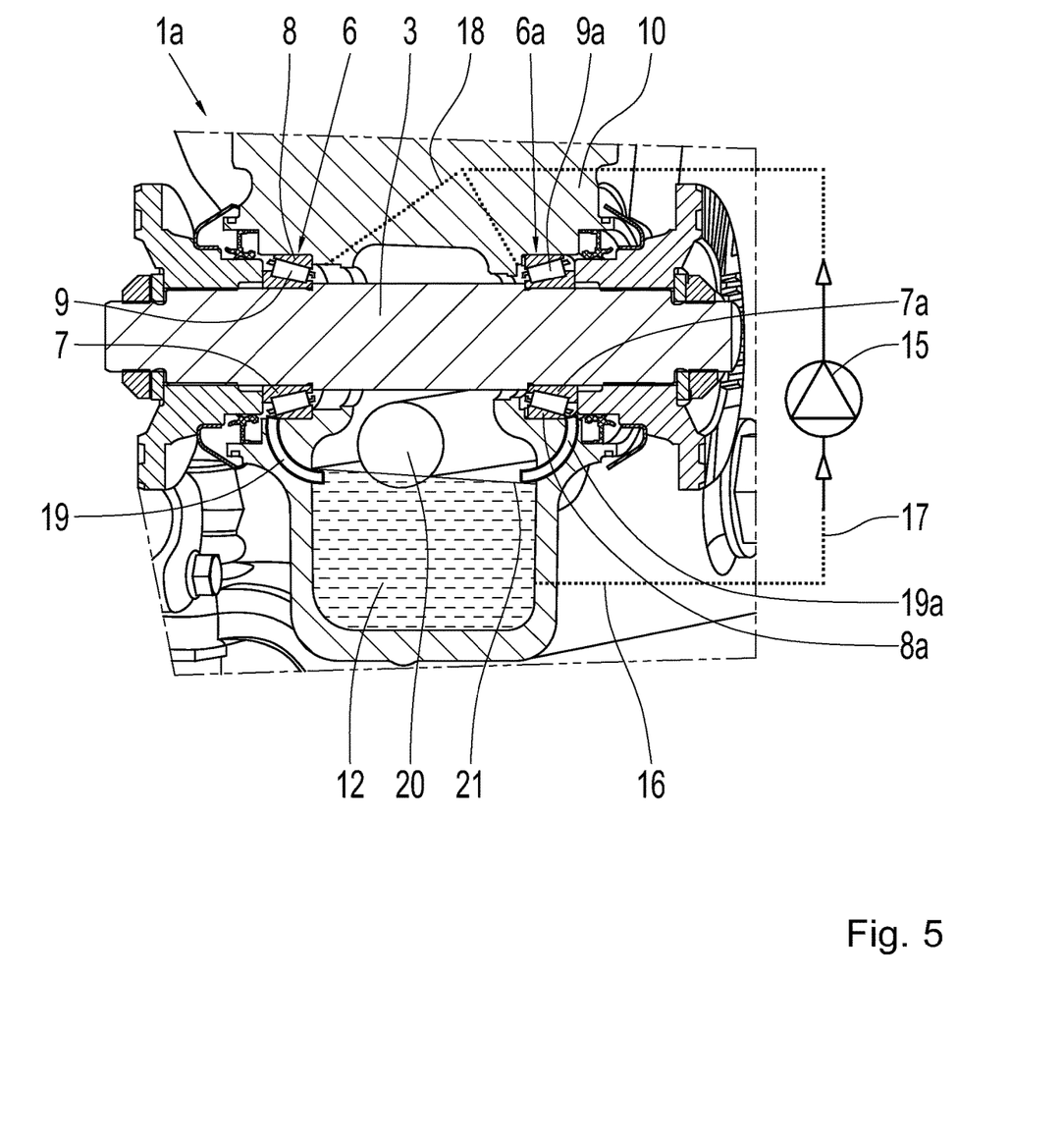
FIG. 5: shows a drive module according to a second example embodiment.

FIG. 5 shows the further example embodiment of a drive module 1a according to the invention.

The drive module 1a includes the bearing units 6, 6a having the inner bearing ring 7, 7a and an outer bearing ring 8, 8a and the rolling elements 9, 9a.

Furthermore, the axle casing 2 has the interior space 11 which is partially filled with oil for lubricating the surrounding components. The oil has an oil level 21 and thus forms an oil sump 12.

The drive module 1a also has an external oil pump 15.

The external oil pump 15 can be connected to the oil sump 12 via a first bore 16 in the axle casing 2. The oil can be conducted above the bearing units 6, 6a through external lines 17 counter to the direction of gravity by the oil pump 15. There, the oil can be distributed onto the two bearing units 6, 6a through second bores 18 in the axle casing 2. The second bores 18 can be introduced above the respective bearing units 6, 6a. By the second bores 18, the oil can be conducted to the rolling elements 9, 9a through respective openings in the bearing unit 6a, 6. As a result, an adjustable amount of oil can be supplied to the bearing units 6, 6a as lubricant.

Furthermore, a bypass channel 19, 19a can be provided for each of the bearing units 6, 6a, each bypass channel 19, 19a forming a fluidic connection from the bearing units 6, 6a to the interior space 11.

The bypass channel 19, 19a is arranged at the bottom of the bearing unit 6, 6a, respectively, and is used to return excess amounts of supplied oil into the interior space 11.

In this way, oil in the bearing unit 6, 6a can be prevented from overheating. The particular bypass channel 19, 19a can also be formed, for example, as a simple bore.

Furthermore, the particular bypass channel 19, 19a can be arranged axially on the end opposite the respective fluid openings. This means, the lubricating fluid, in particular the oil, passes through the rolling elements 9, 9a in an axial direction A and only then flows back into the oil sump 12.

As a result, the bearing units 6, 6a can be sufficiently oiled during their entire period of operation and thus have a longer service life. Due to the two example embodiments, the problem of an oil level 21 being too low to lubricate the bearing units 6, 6a can be overcome.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE CHARACTERS 1, 1a drive module
2 axle casing
3 shaft
4 shield plate
5 flange
6, 6a bearing unit
7, 7a inner bearing ring
8, 8a outer bearing ring
9, 9a rolling element
10, 10a turbulizer
11 interior space
12 oil sump
13 sealing lips
14, 14a fluid bore
15 oil pump
16 first bore
17 lines
18 second bore
19, 19a bypass channel
20 drive shaft
21 oil level
22 prong

The invention claimed is:

1. A drive module (1, 1a), comprising:
   an axle casing (2);
   a shaft (3) rotatably mounted in an interior space (11) of the axle casing (2);
   two bearing units (6, 6a) disposed opposite each other and secured in an axial direction in the axle casing (2), each of the two bearing units (6, 6a) comprising an inner bearing ring (7, 7a) fixedly connected to the shaft (3), an outer bearing ring (8, 8a) fixedly connected to the axle casing (2), and rolling elements (9, 9a) arranged between the inner bearing ring (7, 7a) and the outer bearing ring (8, 8a); and
   a drive shaft (20) arranged in the axle casing (2) underneath the shaft (3) and disposed transversely to the shaft (3), the drive shaft (20) being arranged between the two bearing units (6, 6a) in the interior space (11) of the axle casing (2),
   wherein a lubricating fluid is present at least in the interior space (11), the lubricating fluid forming a fluid reservoir at a bottom of the interior space (11),
   wherein the axle casing (2) comprises at least one fluid opening that extends, in each case, from the interior space (11) to a respective one of the two bearing units (6, 6a) for conducting the lubricating fluid to the rolling elements (9, 9a),
   wherein at least one conduction device is fluidically connected to the fluid reservoir and is configured for conducting the lubricating fluid from the interior space (11) to a respective one of the at least one fluid opening, and
   wherein the at least one conduction device is at least one mechanical turbulizer (10, 10a) co-rotationally mounted on the drive shaft (20) and configured for at least partially plunging into the fluid reservoir during rotation of the drive shaft (20).

2. The drive module (1, 1a) of claim 1, wherein the at least one mechanical turbulizer (10, 10a) is fastened on the drive shaft (20) by a clamp or by a bolt.

3. The drive module (1, 1a) of claim 1, wherein the at least one mechanical turbulizer (10, 10a) is integrally arranged on the drive shaft (20).

4. The drive module (1, 1a) of claim 1, wherein the at least one mechanical turbulizer (10, 10a) comprises a plurality of mechanical turbulizers (10, 10a), the plurality of mechanical turbulizers (10, 10a) being one or both of:
   differently designed from each other; or
   distributed over a circumference of the drive shaft (20).

5. The drive module (1, 1a) of claim 1, wherein the at least one fluid opening comprises a plurality of fluid openings in the axle casing (2) arranged facing from the respective one of the two bearing units (6, 6a), in each case, toward the interior space (11) to establish a fluidic connection between the two bearing units (6, 6a) and the fluid reservoir.

6. The drive module (1, 1a) of claim 5, wherein the plurality of fluid openings in the axle casing (2) are arranged underneath the shaft (2).

7. The drive module (1, 1a) of claim 6, wherein at least some of the plurality of fluid openings are disposed in the axle casing (2) to align with the rolling elements (9, 9a) to guide the lubricating fluid to the rolling elements (9, 9a).

8. The drive module (1, 1a) of claim 5, wherein the plurality of fluid openings in the axle casing (2) are formed as bores.

9. The drive module (1, 1a) of claim 8, wherein at least some of the plurality of fluid openings are disposed in the axle casing (2) to align with the rolling elements (9, 9a) to guide the lubricating fluid to the rolling elements (9, 9a).

10. The drive module (1, 1a) of claim 1, wherein the shaft (3) comprises at least one fluid-conducting channel extending in the axial direction to a respective one of the at least one fluid opening.

11. The drive module (1, 1a) of claim 10, wherein the at least one fluid-conducting channel are grooves on the shaft (3).

12. The drive module (1, 1*a*) of claim 11, wherein the at least one fluid-conducting channel are distributed over a circumference of the shaft (3).

\* \* \* \* \*